US011650987B2

(12) United States Patent
Bordawekar et al.

(10) Patent No.: US 11,650,987 B2
(45) Date of Patent: May 16, 2023

(54) QUERY RESPONSE USING SEMANTICALLY SIMILAR DATABASE RECORDS

(71) Applicant: International Business Machines Corporation, Armonk, NY (US)

(72) Inventors: Rajesh Bordawekar, Westchester, NY (US); Jose Neves, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 16/238,231

(22) Filed: Jan. 2, 2019

(65) Prior Publication Data

US 2020/0210431 A1    Jul. 2, 2020

(51) Int. Cl.
    *G06F 16/2455*    (2019.01)
    *G06F 16/21*      (2019.01)
    *G06F 16/22*      (2019.01)

(52) U.S. Cl.
    CPC ...... *G06F 16/24556* (2019.01); *G06F 16/212* (2019.01); *G06F 16/2237* (2019.01)

(58) Field of Classification Search
    CPC ............ G06F 16/24556; G06F 16/212; G06F 16/2237
    See application file for complete search history.

(56) References Cited

U.S. PATENT DOCUMENTS

| 9,690,848 B2 | 6/2017 | Thollot et al. |
| 2012/0143793 A1 | 6/2012 | Bowers et al. |
| 2013/0007001 A1* | 1/2013 | Komedani ............ G06F 16/332 |
| | | 707/741 |
| 2013/0304740 A1* | 11/2013 | Botros .................. G06F 16/285 |
| | | 707/737 |
| 2014/0149177 A1* | 5/2014 | Frank ..................... G06F 40/30 |
| | | 705/7.29 |
| 2017/0161396 A1* | 6/2017 | Hassanzadeh ........ G06F 16/258 |
| 2017/0287287 A1* | 10/2017 | Froy .................... G07F 17/3251 |
| 2018/0052894 A1* | 2/2018 | Eide ...................... G06F 16/221 |

(Continued)

OTHER PUBLICATIONS

Cuzzocrea et al., "Searching semantic data warehouses: models, issues, architectures", SSW'12: Proceedings of the 2nd International Workshop on Semantic Search over the Web—Article No. 6 Page 1-5 (Year: 2012).*

*Primary Examiner* — Mark D Featherstone
*Assistant Examiner* — Kweku William Halm
(74) *Attorney, Agent, or Firm* — Garg Law Firm, PLLC; Rakesh Garg; Peter Edwards

(57) ABSTRACT

From a first attribute-value pair in a record, new data is created including a first token. Using a first model and using a processor and a memory, each token is vectorized into new data including a corresponding vector. From the record, a target row is selected, wherein a target attribute-value pair in the target row includes a value for which a semantic similarity computation is to be performed. Using a similarity measure, a set of most similar rows to the target row is determined, wherein each row in the set of most similar rows to the target row has a corresponding similarity measure above a threshold similarity measure and wherein each row in the set of most similar rows includes the target attribute. The set of most similar rows is used to compute a response to a database query.

19 Claims, 9 Drawing Sheets

(56) References Cited

U.S. PATENT DOCUMENTS

2018/0165362 A1    6/2018  Engelko et al.
2018/0341630 A1*  11/2018  DeVries .................. G06F 40/14
2019/0266257 A1*   8/2019  Natchu ................. G06F 16/137
2019/0278777 A1*   9/2019  Malik ............... G06F 16/24578

* cited by examiner

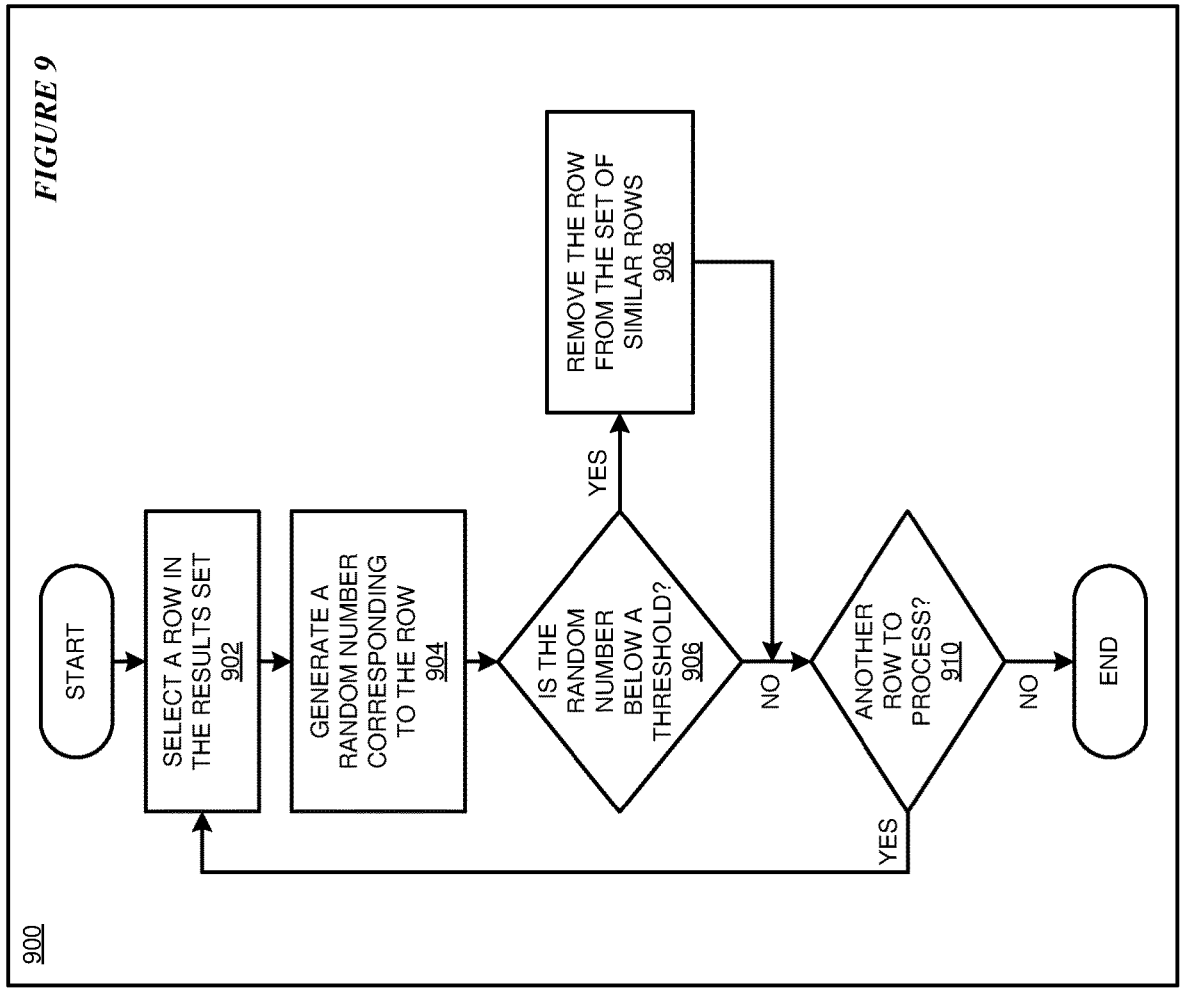

QUERY RESPONSE USING SEMANTICALLY SIMILAR DATABASE RECORDS

TECHNICAL FIELD

The present invention relates generally to a method, system, and computer program product for database query response using records in a database or other data compendium. More particularly, the present invention relates to a method, system, and computer program product for query response using semantically similar records.

BACKGROUND

A database is an organized collection of data, generally stored and accessed electronically from a computer system. A database management system is software that allows users and applications to interact with data in the database, including entry, storage, retrieval, and organization of that data. The database, database management system, and any associated applications are referred to collectively as a database system.

Many database systems organize data according to a relational model and are referred to as relational database systems. A relational model organizes data into one or more tables, or relations, of columns and rows. Generally, each table represents one entity type (such as customers or products). Rows, also called records or tuples, in a table represent instances of that type of entity (such as a particular customer or particular product). Columns, also called attributes, in a table represent attributes of a particular instance (such as an address or price). Thus, an intersection of a row and a column holds a value attributed to an instance (such as a particular customer's address or the price of a particular product).

In some database systems, each row in each table has its own unique key, called a primary key. Each primary key selects one and only one row in a table, for access and possible modification. By adding a column for the primary key of a linked row into another table, primary keys are used to define relationships among tables. Primary keys are typically system-assigned integers, to enforce uniqueness and allow for efficient data access.

Online Analytical Processing (OLAP) is a category of software tools used to perform multidimensional data analysis, often using a relational database. A user forms a query requesting particular data—for example, all sales for a particular day of a particular product in a particular region—and the database returns records from the database that match the query.

One common family of OLAP database queries uses aggregation. Aggregation is the process of consolidating multiple values into a single value. For example, data can be collected on a daily basis and aggregated into a value for the week, the weekly data can be aggregated into a value for the month, and so on. A database query language typically provides a variety of aggregation functions. For example, a sum function sums all the data being aggregated into one value, an average function averages all the data being aggregated into one value, and a minimum function finds the minimum value of all the data being aggregated. Aggregate data is calculated using a hierarchy.

Even in the absence of a hierarchical data structure that would allow use of the aggregation functions, it is often useful to group rows together, then run on a query on just those rows. A group-by operation collects all rows with a value matching a constraint. For example, consider a database containing car sales data. A user might use a group-by operation to collect all the rows holding data for car sales in New York, another group-by operation to collect all the rows holding data for car sales in New Jersey, then use a sum operation on each collection to obtain total sales numbers for the year for New York and New Jersey.

SUMMARY

The illustrative embodiments provide a method, system, and computer program product. An embodiment includes a method that creates new data comprising a first token, from a first attribute-value pair in a record, the record comprising a set of rows, a row in the set of rows comprising a set of values wherein a value in the set of values corresponds to an attribute, the value and the attribute comprising the first attribute-value pair, and the first token comprising a text string corresponding to the first attribute-value pair. An embodiment vectorizes, using a first model and using a processor and a memory, each token into new data comprising a corresponding vector. An embodiment selects, from the record, a target row, wherein a target attribute-value pair in the target row includes a value for which a semantic similarity computation is to be performed. An embodiment determines, using a similarity measure, a set of most similar rows to the target row, wherein each row in the set of most similar rows to the target row has a corresponding similarity measure above a threshold similarity measure and wherein each row in the set of most similar rows includes the target attribute. An embodiment uses the set of most similar rows to compute a response to a database query.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 9 depicts a flowchart of an example process for query response using semantically similar records in accordance with an illustrative embodiment.

DETAILED DESCRIPTION

Figure 1:
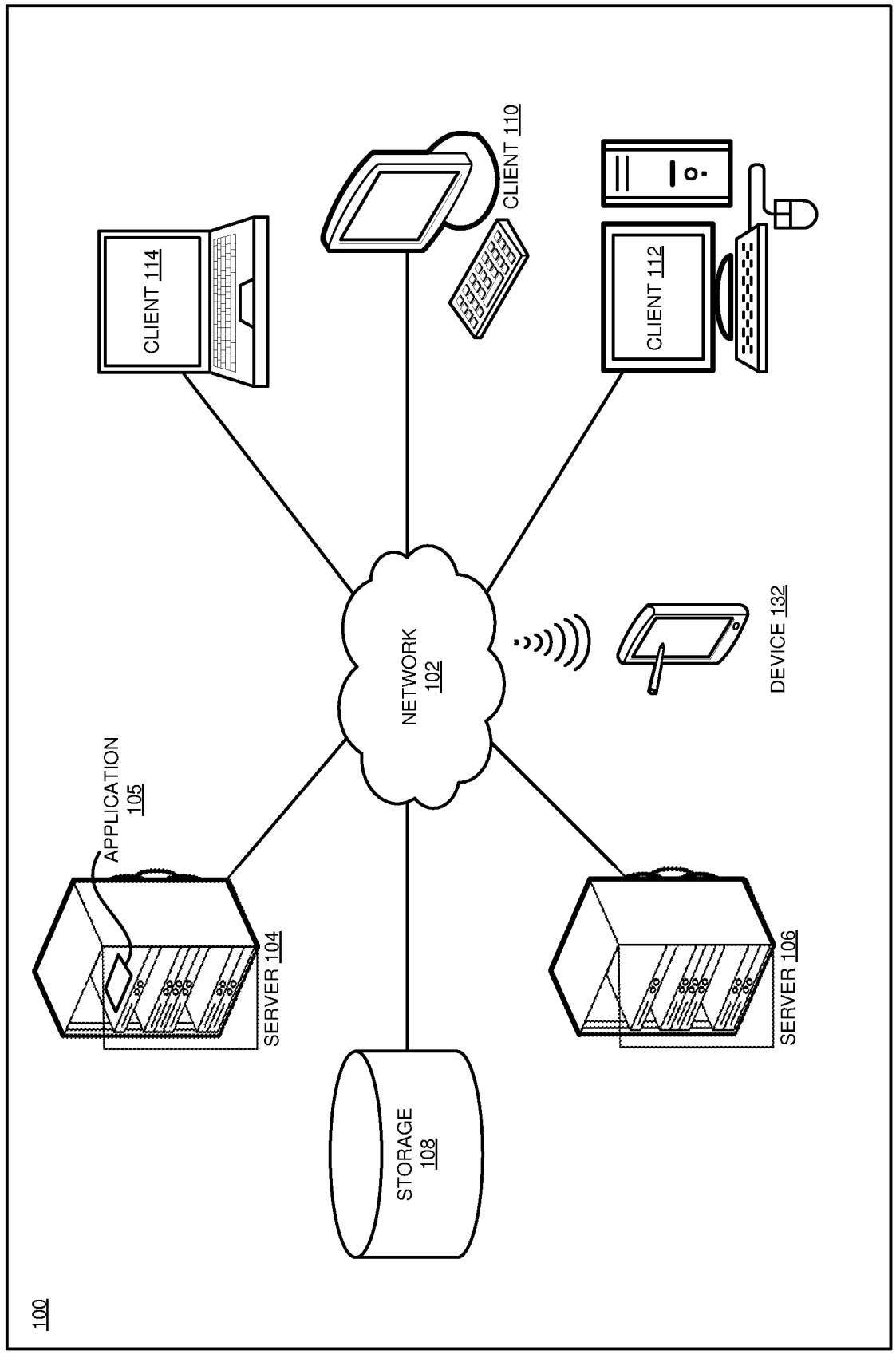
FIG. 1 depicts a block diagram of a network of data processing systems in which illustrative embodiments may be implemented.

The illustrative embodiments recognize that existing group-by and aggregate operations perform their functions by matching values of an attribute. Data, or values, from one or more other attributes in different rows are grouped, or aggregated together, if the value of a common attribute in those rows matches or qualifies for a grouping criterion. For example, a group-by query on a database of car sales data that requests data for sales in New York will look for a value of the "state" attribute that matches "New York". Similarly, a request for total sales of compact cars for the year would need to specify particular models of compact cars, or the database would need to include an attribute identifying certain models as compact cars.

However, the illustrative embodiments recognize that value matching in this manner returns only results for which an attribute values matches a particular value. There is an unmet need to return query results for which an attribute value is instead semantically similar to another value.

As used herein, semantic similarity (or semantically similar) refers to similarity measured by a particular relationship of the items being compared. For example, using a semantic similarity measure modeling relationships between values based on biological similarity, "cat" and "kitten" might be considered semantically very similar because both refer to the same species. "Cat" and "tiger" might be considered slightly more semantically distant because they refer to different species, although both are felines. "Cat" and "giraffe" might be considered even more semantically distant because they refer to different families of species, although both are mammals. "Cat" and "1234" might be considered more distant still because one refers to an animal and the other does not. And using a different relationship modeled as a different similarity measure, "cat" and "dog" might be more similar than "cat" and "tiger", because cats and dogs are both within a group of animals considered as pets and tigers are not.

As well, for data arranged in a hierarchical scenario (e.g. day, month, quarter, year), the aggregation choices are usually fixed. For example, a query requesting computation of a sum of all car sales for the first quarter of 2017 and 2018 would aggregate sales numbers for all days in first three months of 2017 and 2018. However, instead of aggregating using the first quarter, one might want to aggregate the sum of all car sales for the quarter of 2017 and 2018 which is most similar to the first quarter of 2016.

Consequently, the illustrative embodiments recognize that there is an unmet need to respond to queries using group-by and aggregate operations not by value matching, but by finding values that are semantically similar to a value in a query.

The illustrative embodiments recognize that the presently available tools or solutions do not address these needs or provide adequate solutions for these needs. The illustrative embodiments used to describe the invention generally address and solve the above-described problems and other problems related to query response using semantically similar records.

An embodiment can be implemented as a software application. The application implementing an embodiment can be configured as a modification of an existing database system, as a separate application that operates in conjunction with an existing database system, a standalone application, or some combination thereof.

Particularly, some illustrative embodiments provide a method by which a set of most similar rows can be determined and used to compute a response to a database query.

An embodiment takes as input record data arranged in rows and columns. Alternatively, input record data may be in a different format but rearrangeable into a row-column format. Columns in a table are also called attributes. Each row-column intersection in a table holds a value. Thus, a row can also be considered to hold a series of attribute-value pairs. One column, or attribute, is assigned to store the primary key of each row. Thus, the primary key of a particular row also has a value and can also be considered an attribute-value pair.

An embodiment also receives, as part of a database query, a designation of an attribute value within a particular row. The designated row is called the target row, the attribute having a value requiring a similarity analysis is called the target attribute, and the value of the target attribute is called the target value.

An embodiment converts one or more values in a row, including the value of the primary key of the row, to tokens, each token corresponding to an attribute-value pair. An embodiment also converts one or more values in the target row, including the value of the primary key of the target row, to tokens. In one exemplary implementation, each token is a text string including an attribute name, separator, and the corresponding value. For example, for an attribute corresponding to the first names of people, with values of "Alice" and "Bob" respectively, corresponding tokens in this exemplary format might be FNAME_Alice and FNAME_Bob. However, other token implementations, including a format other than a text string, other representations of attribute, value, and separator, and other data included in each token, are also contemplated within the scope of the exemplary embodiments.

An embodiment further converts, using an embedding model, a token in a row to a corresponding vector representation, also known as an embedding. In the same manner, an embodiment converts tokens in the target row to corresponding vector representations. A vector representation, or vector, as used herein, is a set of real numbers within a fixed range. The number of real numbers in the set—also called the dimension—is also fixed. As a non-limiting example, one commonly-used dimension is 300, and each real number is between −1 and 1. Other dimensions and ranges are also possible and contemplated within the scope of the illustrative embodiments. Each unique token corresponds to a unique vector. The token-to-vector conversion is configured such that one can measure similarity between two tokens by measuring the similarity between one vector corresponding to one of the tokens and a second vector corresponding to the second token.

An embodiment includes an embedding model implementing a token-to-vector conversion. In one embodiment, the embedding model is trained before use, using data in the database. To train the embedding model, the database is textified, or converted to a meaning text corpus. Then the text corpus is used as input to a training model. In another embodiment, an embedding model implementing a token-to-vector conversion is replaced with another embedding model implementing a different token-to-vector conversion. Embedding models depend on the input text source used to train each embedding model. Different views of relational tables within a database result in different embedding models, resulting in a different vector for the same token. The replacement embedding model may have been trained differently from the first embedding model. By changing the embedding model, one measure of similarity between tokens, modeling one relationship, can be replaced by a different measure of similarity between tokens modeling a different relationship. For example, using one semantic similarity measure modeling relationships between values based on biological similarity, "cat" and "tiger" might be considered more semantically similar to each other than "cat" and "dog" because both "cat" and "tiger" refer to felines but "dog" refers to a canine. Using a different relationship modeled as a different similarity measure, "cat" and "dog" might be more similar than "cat" and "tiger", because cats and dogs are both within a group of animals considered as pets and tigers are not.

One non-limiting method of measuring vector similarity is cosine similarity, which computes similarity between two non-zero vectors by measuring the cosine of the angle between the two vectors. The cosine of 0 degrees is 1, so two vectors with the same orientation—in other words, maximally similar—have a cosine similarity of 1. The cosine of 90 degrees is 0, so two vectors oriented at 90° relative to each other—in other words, maximally dissimilar—have a cosine similarity of 0. Other pairs of vectors having angles between 0 and 90 degrees will have corresponding cosine similarities between 0 and 1. These bounds apply to vectors having any number of dimensions. In particular, cosine similarity can be computed using the expression:

$$\frac{\sum_{i=1}^{n} A_i B_i}{\sqrt{\sum_{i=1}^{n} A_i^2} \sqrt{\sum_{i=1}^{n} B_i^2}}$$

where $A_i$ and $B_i$ are components of vector A and B respectively.

This example of a method for determining similarity is not intended to be limiting. From this disclosure, those of ordinary skill in the art will be able to conceive other ways with which to determine similarity and the same are contemplated within the scope of the illustrative embodiments. For example, similarity between two vectors can also be determined by computing a distance between the two vectors (the difference between two vectors v and w is the length of the difference vector v-w). The vectors with the least distance between each other are the most similar vectors. For example, the Euclidian distance between two vectors v and w is the length of the line segment connecting v and w. The Manhattan distance between two vectors v and w is the sum of the absolute differences of the Cartesian coordinates of each of v and w. Generalizations of both Euclidian and Manhattan distances are also possible, and additional distance or similarity measures are also applicable to measure similarity between vectors.

An embodiment determines a set of rows that are the most similar rows, among rows being compared using a similarity measure, to the target row. One embodiment determines most similar rows by computing a similarity measure between the primary key token of the target row and the primary key token of each of a set of other rows in the record. The most similar rows are those containing the most similar, as measured by the similarity measure, primary key token to the target row's primary key token.

Another embodiment determines the most similar rows to the target row by computing a measure of similarity between the target token and the token corresponding to the target attribute of another row in the record. The most similar rows are those containing tokens corresponding to the target attribute that are the most similar, as measured by the similarity measure, to the target token.

An embodiment determines similarity between tokens by computing a similarity, such as cosine similarity or other similarity determination methods, between corresponding vectors. An embodiment chooses, as the set of most similar rows, all the rows that have a higher than a threshold value of similarity. For example, an embodiment might select all the rows having a similarity measure above 0.5 (on a 0-1 scale).

Another embodiment determines a set of rows that are the least similar rows, among rows being compared using a similarity measure, to the target row. The least similar (or most dissimilar) rows are those containing the least similar, as measured by the similarity measure, primary key token to the target row's primary key token. An embodiment chooses all the rows that have a lower than a threshold value of similarity. For example, an embodiment might select all the rows having a similarity measure below 0.5 (on a 0-1 scale).

An embodiment adds an optional second level of filtering to reduce variability in the number of rows in the result set obtained using different embedding models. This approach assumes that different models derived from the same data does not produce significantly different models. To implement this second filtering, an embodiment generates a random number corresponding to each row in the result set. If a row's random number is above a threshold, the row is kept in the set of most similar rows; if not, the row is removed from the set of most similar rows. A pseudo-random number produced by an existing random number generator is usable for this operation of the embodiment.

Once an embodiment has determined a set of most (or least) semantically similar rows in a manner described herein, the embodiment uses the set of rows to respond to the received database query.

Using a model of semantic relationships to determine semantically similar rows in a manner described herein can also be performed on data that is not textual. One embodiment converts numerical data to corresponding text data using a standard number-to-string conversion function (e.g. a number-to-string conversion function included in a programming language library of standard functions or a database query language library of standard functions), then computes a corresponding embedding for the converted data and proceeds as described herein. This embodiment produces a set of similar rows, with similarity evaluated according to a degree of semantic similarity between the texts of compared numerical data. In such a scheme, for example, while the numbers 7 and 77 might not be considered as numerically similar as 7 and 8, the text strings "seven" and "seventy-seven" might be considered more semantically similar than "seven" and "eight" because "seven" and "seventy-seven" both include the substring "seven" while "seven" and "eight" have only one common character. Another embodiment computes embeddings corresponding to images stored in rows of a database and proceeds in a manner described herein to return a set of rows containing similar images in response to a database query. To compute an embedding corresponding to an image, an embodiment uses text tags associated with an image to build a multi-modal word embedding model. Text tags associated with an image are used to describe the image. For example, an image, stored in an image database, of a beach might have associated text tags such as "beach", "palm tree", "sand", "sun", and "Florida".

The manner of query response using semantically similar records described herein is unavailable in the presently available methods in the technological field of endeavor pertaining to grouping an aggregation for data records. A method of an embodiment described herein, when implemented to execute on a device or data processing system, comprises substantial advancement of the functionality of that device or data processing system in determining semantically similar rows to a target row.

The illustrative embodiments are described with respect to certain types of databases, records, tables, rows, attributes, tokens, similarity measures, models, relationships, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
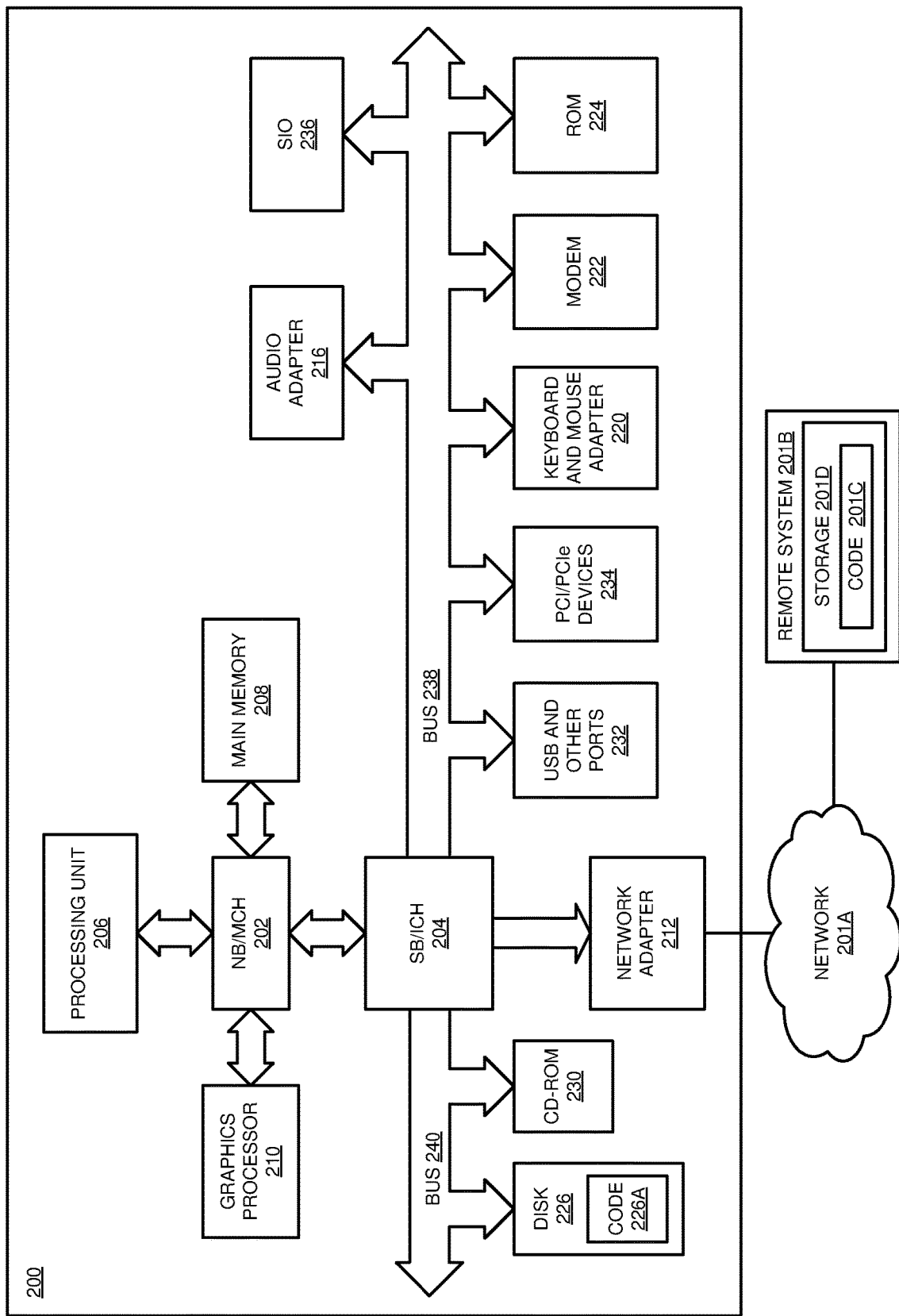
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 operates on data records stored in storage unit 108, or any other suitable location. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
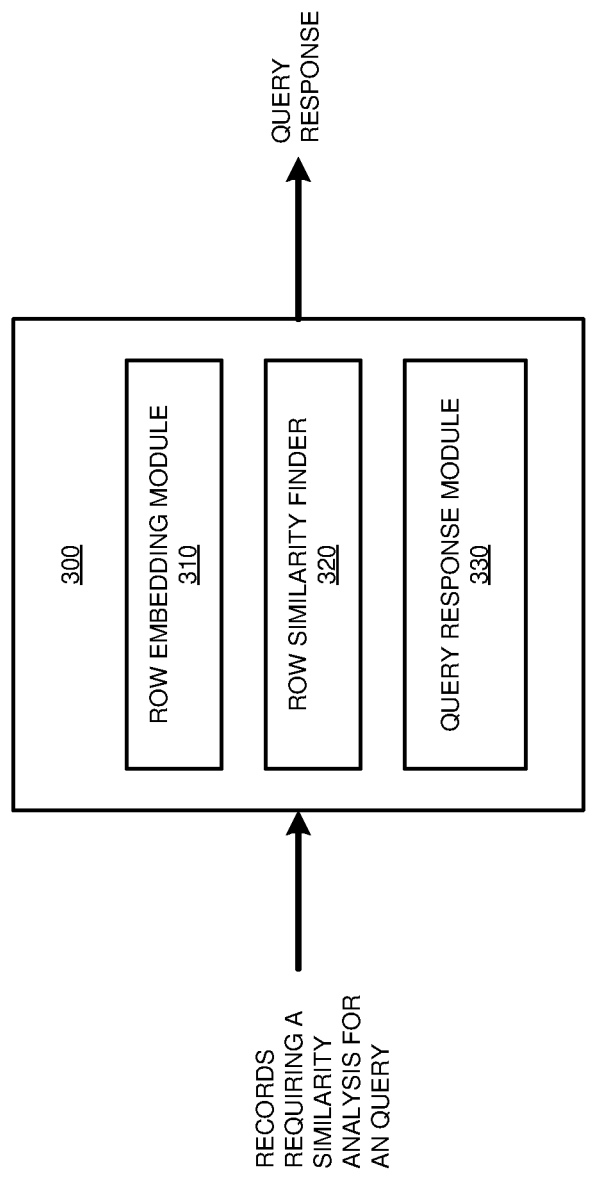
FIG. 3 depicts a block diagram of an example configuration for query response using semantically similar records in accordance with an illustrative embodiment.

With reference to FIG. 3, this figure depicts a block diagram of an example configuration for query response using semantically similar records in accordance with an illustrative embodiment. Application 300 is an example of application 105 in FIG. 1 and executes in any of servers 104 and 106 and clients 110, 112, and 114 in FIG. 1.

Application 300 takes as input record data arranged in rows and columns, or record data that can be rearranged into a row-column format. Application 300 also receives, as part of a database query, a designation of an attribute value within a particular row.

Row embedding module 310 converts one or more values in a row, including the value of the primary key of the row, to tokens, each token corresponding to an attribute-value pair. Row embedding module 310 also tokenizes the target row. Row embedding module 310 further converts a token in a row to a corresponding vector representation, also known as an embedding. Row embedding module 310 also converts the tokenized target row to a vector representation.

Each embedding is a vector of real numbers, of a selected dimension. Each unique token corresponds to a unique vector, and the token-to-vector conversion is configured such that a measure of similarity between two tokens is determined by measuring the similarity between one vector corresponding to one of the tokens and a second vector corresponding to the second token.

Once a row has been tokenized and tokens converted to corresponding vector representations, row similarity finder 320 determines a set of rows that are the most similar rows to the target row. One embodiment determines most similar rows by computing a similarity measure between the primary key token of the target row and the primary key token of each of a set of other rows in the record. The most similar rows are those containing the most similar, as measured by the similarity measure, primary key token to the target row's primary key token.

Query response module 330 chooses, as the set of most similar rows, all the rows that have a higher than a threshold value of similarity. Alternatively, if the query requested a set of least similar rows, module 330 chooses, as the set of least similar rows, all the rows that have a lower than a threshold value of similarity. Module 330 uses the set of rows to respond to the received database query.

Figure 4:
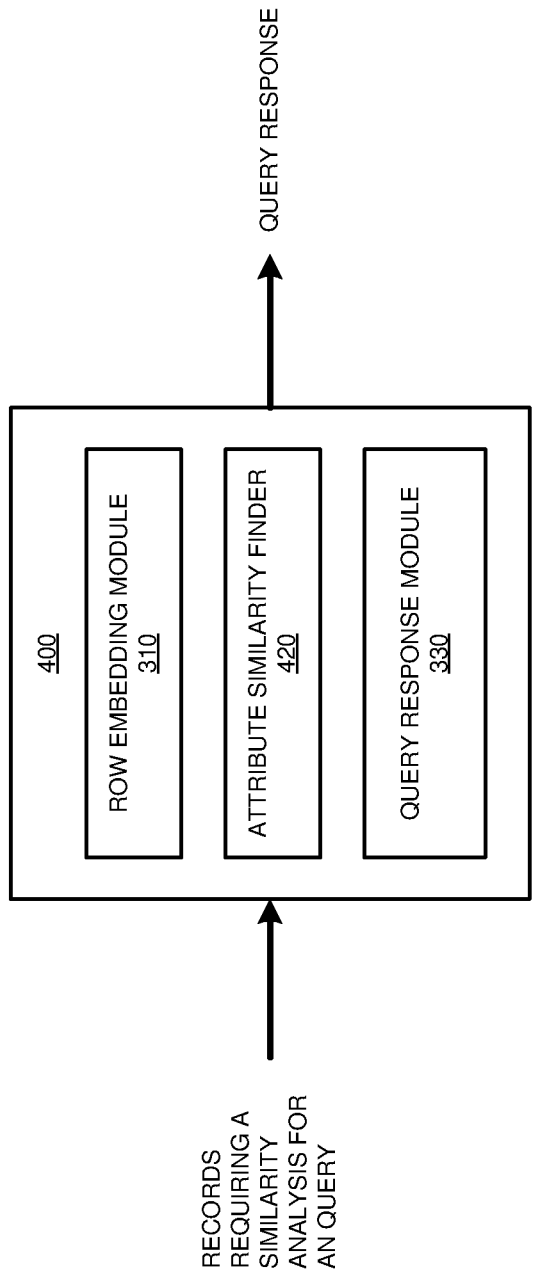
FIG. 4 depicts a block diagram of an example configuration for query response using semantically similar records in accordance with an illustrative embodiment.

With reference to FIG. 4, this figure depicts a block diagram of an example configuration for query response using semantically similar records in accordance with an illustrative embodiment. Application 400 is an example of application 105 in FIG. 1 and executes in any of servers 104 and 106 and clients 110, 112, and 114 in FIG. 1. As well, token embedding module 310 and record correction module 330 are the same as token embedding module 310 and record correction module 330 in FIG. 3.

Application 400 takes as input record data arranged in rows and columns, or record data that can be rearranged into a row-column format. Application 400 also receives, as part of a database query, a designation of an attribute value within a particular row.

Once module 310 has tokenized a row and converted tokens to corresponding vector representations, attribute similarity finder module 420 determines the most similar rows to the target row by computing a measure of similarity between the target token and the token corresponding to the target attribute of another row in the record. The most similar rows are those containing tokens corresponding to the target attribute that are the most similar, as measured by the similarity measure, to the target token. Query response module 330 chooses, as the set of most (or least) similar rows, all the rows that have a higher (or lower) than a threshold value of similarity, and uses the set of rows to respond to the received database query.

Figure 5:
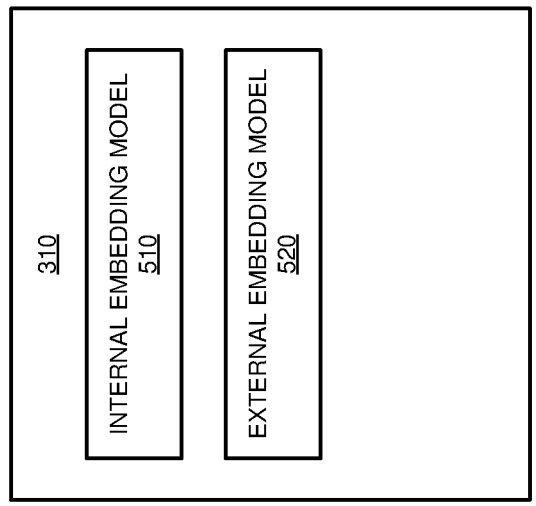
FIG. 5 depicts further detail of a block diagram of an example configuration for query response using semantically similar records in accordance with an illustrative embodiment.

With reference to FIG. 5, this figure depicts further detail of a block diagram of an example configuration for query response using semantically similar records in accordance with an illustrative embodiment. In particular, FIG. 5 depicts more detail of block 310 in FIG. 3.

Internal embedding model 510 implements a token-to-vector conversion trained using data in the database. External embedding model 520 implements a token-to-vector conversion trained differently from model 510. Models 510 and 520 are interchangeable for use in implementing a token-to-vector conversion.

Figure 6:
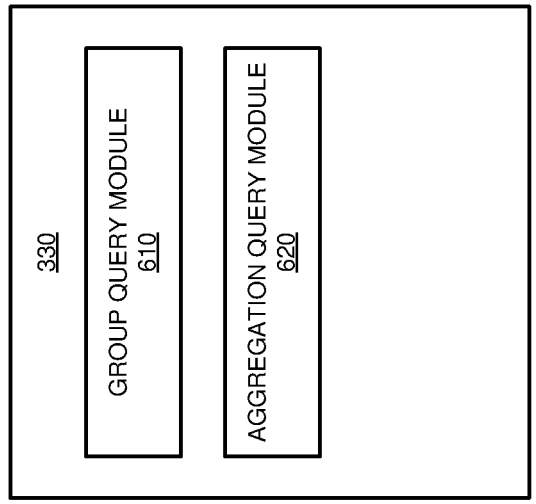
FIG. 6 depicts further detail of a block diagram of an example configuration for query response using semantically similar records in accordance with an illustrative embodiment.

With reference to FIG. 6, this figure depicts further detail of a block diagram of an example configuration for query response using semantically similar records in accordance with an illustrative embodiment. In particular, FIG. 6 depicts more detail of block 330 in FIG. 3.

Group query module 610 uses the set of most (or least) similar rows to respond to a group-by query. Aggregation query module 620 aggregates the set of most (or least) similar rows to respond to a aggregation query.

Figure 7:
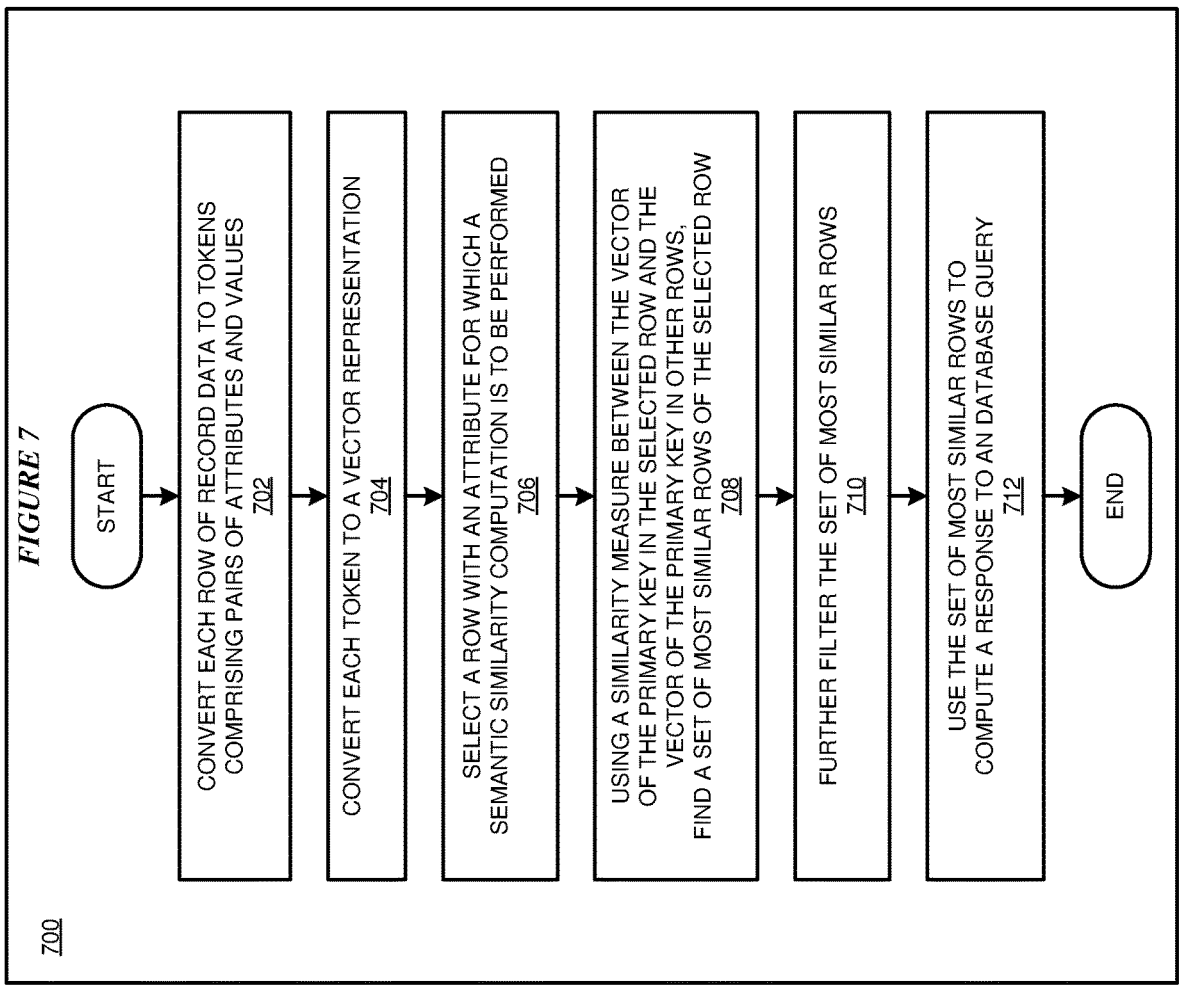
FIG. 7 depicts a flowchart of an example process for query response using semantically similar records in accordance with an illustrative embodiment.

With reference to FIG. 7, this figure depicts a flowchart of an example process for query response using semantically similar records in accordance with an illustrative embodiment. Process 700 can be implemented in application 300 in FIG. 3.

In block 702, the application converts rows of record data to corresponding rows of tokenized data, with each token comprising an attribute and corresponding value. In block 704, the application converts tokens to a corresponding vector representations. In block 706, the application selects a target row, i.e. a row with an attribute for which a semantic similarity computation is to be performed. In block 708, the application uses the cosine similarity or another similarity measure between the vector corresponding to the target primary key token in the target row and the vector corresponding to the primary key token in other rows to find closest rows of the target row. In block 710, the application further filter the set of most similar rows. In block 712, the application uses the set of most similar rows to compute a response to an database query. Then the application ends.

Figure 8:
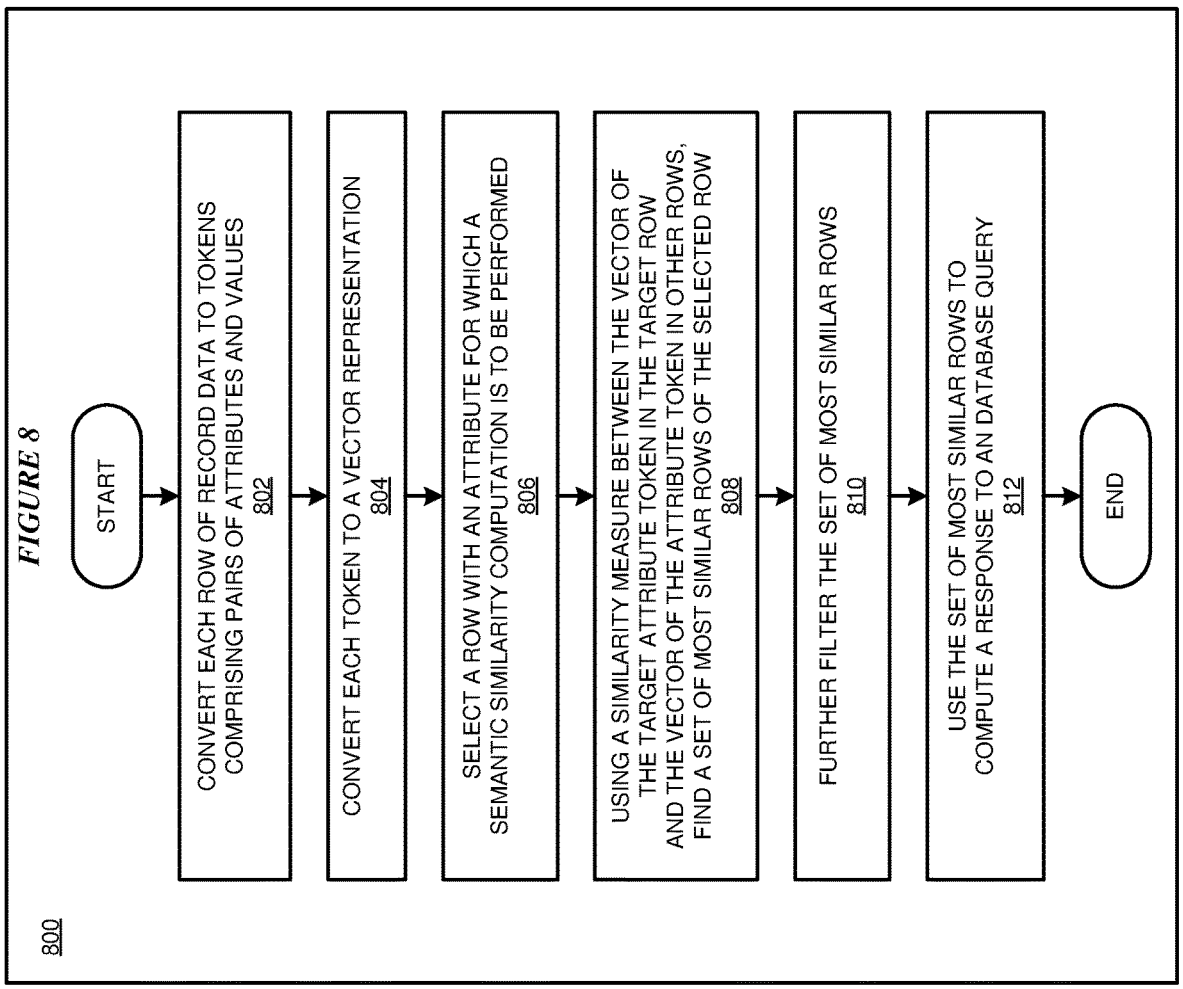
FIG. 8 depicts a flowchart of an example process for query response using semantically similar records in accordance with an illustrative embodiment.

With reference to FIG. 8, this figure depicts a flowchart of an example process for query response using semantically similar records in accordance with an illustrative embodiment. Process 800 can be implemented in application 400 in FIG. 4.

In block 802, the application converts rows of record data to corresponding rows of tokenized data, with each token comprising an attribute and corresponding value. In block 804, the application converts tokens to a corresponding vector representations. In block 806, the application selects a target row, i.e. a row with an attribute for which a semantic similarity computation is to be performed. In block 808, the application uses the cosine similarity or another similarity measure between the vector corresponding to the target attribute token in the target row and the vector corresponding to the target attribute token in other rows to find closest rows of the target row. In block 810, the application further filter the set of most similar rows. In block 812, the application uses the set of most similar rows to compute a response to an database query. Then the application ends.

With reference to FIG. 9, this figure depicts a flowchart of an example process for query response using semantically similar records in accordance with an illustrative embodiment. Process 900 can be implemented in application 300 in FIG. 3 or application 400 in FIG. 4 and includes more detail of block 710 in FIG. 7 or block 810 in FIG. 8.

In block 902, the application selects a row in the result set. In block 904, the application generates a random number corresponding to the row. In block 906, the application checks whether the random number is below a threshold. If yes ("YES" path of block 906), in block 908, the application removes the row from the set of similar rows. In any case, in block 910 the application checks whether there is another embedded row to process. If yes ("YES" path of block 910), the application returns to block 902. Otherwise ("NO" path of block 910), the application ends.

Thus, a computer implemented method, system or apparatus, and computer program product are provided in the illustrative embodiments for query response using semantically similar records and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
converting a plurality of attribute-value pairs in a record to a corresponding plurality of tokens, the record comprising a set of rows, a row in the set of rows comprising a set of values wherein a value in the set of values comprises a value of a corresponding attribute, the attribute-value pair comprising the value and the attribute, and each token comprising a text string incorporating a name of the attribute, a separator, and the value;
vectorizing, using a first embedding model and using a processor and a memory, each token into new data comprising a corresponding vector, the first embedding model modelling a first relationship between tokens;
selecting, from the record, a target row, wherein a target attribute-value pair in the target row includes a value for which a semantic similarity computation is to be performed;
determining, using a similarity measure measuring a similarity between a first vector and each vector in a plurality of vectors, the first vector comprising a vectorized token in the target row, each vector in the plurality of vectors comprising a vectorized token in a row other than the target row in the set of rows, a result set comprising a set of most similar rows to the target row, wherein each row in the set of most similar rows to the target row has a corresponding similarity measure above a threshold similarity measure and wherein each row in the set of most similar rows includes the target attribute;
generating, for each row in the result set, a corresponding pseudo-random number;
removing, from the result set, a row with a corresponding pseudo-random number not above a threshold; and
using the result set to compute a response to a database query, the database query specifying semantic similarity to a query value.

2. The method of claim 1, wherein the first embedding model is replaced by a second embedding model modelling a second relationship between tokens, the first relationship being different from the second relationship.

3. The method of claim 1, wherein the corresponding vector comprises a numerical representation of each token, the numerical representation comprises a set of real numbers and the set of real numbers comprises a predetermined number of elements.

4. The method of claim 3, wherein the numerical representation comprises a set of real numbers, each real number being between −1 and 1.

5. The method of claim 1, wherein determining the result set comprises:
computing a first degree of similarity between a target primary key vector corresponding to a target primary key token in the target row and a second primary key vector corresponding to a second primary key token in a second row in the record, the target and the second primary key tokens having an attribute acting as a primary key;
adding, to a set of similarities corresponding to rows in the record, the first degree of similarity; and
selecting, from the set of similarities, the result set, each row in the result set having a corresponding degree of similarity within a tolerance of a specified degree of similarity.

6. The method of claim 5, wherein the degree of similarity between a target primary key vector corresponding to a target primary key token in the target row and a second primary key vector corresponding to a second primary key token in a second row in the record comprises a cosine similarity, the cosine similarity comprising a cosine of an angle between two vectors.

7. The method of claim 1, wherein determining the result set comprises:
computing a first degree of similarity between a target vector corresponding to a target token in the target row and a second vector corresponding to a second token in a second row in the record, the target and the second tokens having the target attribute;
adding, to a set of similarities corresponding to rows in the record, the first degree of similarity; and
selecting, from the set of similarities, the result set, each row in the result set having a corresponding degree of similarity within a tolerance of a specified degree of similarity.

8. The method of claim 7, wherein the degree of similarity between a target vector corresponding to a target token in the target row and a second vector corresponding to a second token in a second row in the record comprises a cosine similarity, the cosine similarity comprising a cosine of an angle between two vectors.

9. A computer usable program product comprising one or more computer-readable storage media, and program instructions stored on at least one of the one or more storage media, the stored program instructions comprising:
program instructions to convert a plurality of attribute-value pairs in a record to a corresponding plurality of tokens, the record comprising a set of rows, a row in the set of rows comprising a set of values wherein a value in the set of values comprises a value of a corresponding attribute, the attribute-value pair comprising the value and the attribute, and each token comprising a text string incorporating a name of the attribute, a separator, and the value;
program instructions to vectorize, using a first embedding model and using a processor and a memory, each token into new data comprising a corresponding vector, the first embedding model modelling a first relationship between tokens;
program instructions to select, from the record, a target row, wherein a target attribute-value pair in the target row includes a value for which a semantic similarity computation is to be performed;
program instructions to determine, using a similarity measure measuring a similarity between a first vector and each vector in a plurality of vectors, the first vector comprising a vectorized token in the target row, each vector in the plurality of vectors comprising a vectorized token in a row other than the target row in the set of rows, a result set comprising a set of most similar rows to the target row, wherein each row in the set of most similar rows to the target row has a corresponding similarity measure above a threshold similarity measure and wherein each row in the set of most similar rows includes the target attribute;
program instructions to generate, for each row in the result set, a corresponding pseudo-random number;
program instructions to remove, from the result set, a row with a corresponding pseudo-random number not above a threshold; and
program instructions to use the result set to compute a response to a database query, the database query specifying semantic similarity to a query value.

10. The computer usable program product of claim 9, wherein the first embedding model is replaced by a second embedding model modelling a second relationship between tokens, the first relationship being different from the second relationship.

11. The computer usable program product of claim 9, wherein the corresponding vector comprises a numerical representation of each token, the numerical representation comprises a set of real numbers and the set of real numbers comprises a predetermined number of elements.

12. The computer usable program product of claim 11, wherein the numerical representation comprises a set of real numbers, each real number being between −1 and 1.

13. The computer usable program product of claim 9, wherein program instructions to determine the result set comprises:
program instructions to compute a first degree of similarity between a target primary key vector corresponding to a target primary key token in the target row and a second primary key vector corresponding to a second primary key token in a second row in the record, the target and the second primary key tokens having an attribute acting as a primary key;
program instructions to add, to a set of similarities corresponding to rows in the record, the first degree of similarity; and
program instructions to select, from the set of similarities, the result set, each row in the result set having a corresponding degree of similarity within a tolerance of a specified degree of similarity.

14. The computer usable program product of claim 13, wherein the degree of similarity between a target primary key vector corresponding to a target primary key token in the target row and a second primary key vector corresponding to a second primary key token in a second row in the record comprises a cosine similarity, the cosine similarity comprising a cosine of an angle between two vectors.

15. The computer usable program product of claim 9, wherein program instructions to determine the result set comprises:
program instructions to compute a first degree of similarity between a target vector corresponding to a target token in the target row and a second vector corresponding to a second token in a second row in the record, the target and the second tokens having the target attribute;
program instructions to add, to a set of similarities corresponding to rows in the record, the first degree of similarity; and
program instructions to select, from the set of similarities, the result set, each row in the result set having a corresponding degree of similarity within a tolerance of a specified degree of similarity.

16. The computer usable program product of claim 15, wherein the degree of similarity between a target vector corresponding to a target token in the target row and a second vector corresponding to a second token in a second row in the record comprises a cosine similarity, the cosine similarity comprising a cosine of an angle between two vectors.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to convert a plurality of attribute-value pairs in a record to a corresponding plurality of tokens, the record comprising a set of rows, a row in the set of rows comprising a set of values wherein a value in the set of values comprises a value of a corresponding attribute, the attribute-value pair comprising the value and the attribute, and each token comprising a text string incorporating a name of the attribute, a separator, and the value;

program instructions to vectorize, using a first embedding model and using a processor and a memory, each token into new data comprising a corresponding vector, the first embedding model modelling a first relationship between tokens;

program instructions to select, from the record, a target row, wherein a target attribute-value pair in the target row includes a value for which a semantic similarity computation is to be performed;

program instructions to determine, using a similarity measure measuring a similarity between a first vector and each vector in a plurality of vectors, the first vector comprising a vectorized token in the target row, each vector in the plurality of vectors comprising a vectorized token in a row other than the target row in the set of rows, a result set comprising a set of most similar rows to the target row, wherein each row in the set of most similar rows to the target row has a corresponding similarity measure above a threshold similarity measure and wherein each row in the set of most similar rows includes the target attribute;

program instructions to generate, for each row in the result set, a corresponding pseudo-random number;

program instructions to remove, from the result set, a row with a corresponding pseudo-random number not above a threshold; and program instructions to use the result set to compute a response to a database query, the database query specifying semantic similarity to a query value.

* * * * *